United States Patent [19]
Chong et al.

[11] Patent Number: 5,497,319
[45] Date of Patent: Mar. 5, 1996

[54] MACHINE TRANSLATION AND TELECOMMUNICATIONS SYSTEM

[75] Inventors: Leighton K. Chong, New York, N.Y.; Christine K. Kamprath, Austin, Tex.

[73] Assignee: Trans-link International Corp., Honolulu, Hi.

[21] Appl. No.: 312,440

[22] Filed: Sep. 26, 1994

Related U.S. Application Data

[63] Continuation of Ser. No. 920,456, Aug. 12, 1992, abandoned, which is a continuation-in-part of Ser. No. 636,400, Dec. 31, 1990, Pat. No. 5,175,684.

[51] Int. Cl.$^6$ .................................................. G06F 17/28
[52] U.S. Cl. ............................ 364/419.02; 364/419.11; 395/600
[58] Field of Search .................... 364/419.02, 419.03, 364/419.11; 379/90, 100; 358/400; 395/600

[56] References Cited

U.S. PATENT DOCUMENTS

| | | | |
|---|---|---|---|
| Re. 33,337 | 9/1990 | Lefler et al. | 178/21 |
| 4,352,012 | 9/1982 | Verderber et al. | 235/487 |
| 4,383,307 | 5/1983 | Gibson, III | 395/575 |
| 4,805,207 | 2/1989 | McNutt et al. | 379/89 |
| 4,866,755 | 9/1989 | Hashimoto | 379/80 |
| 4,882,681 | 11/1989 | Brotz | 364/419.03 |
| 4,916,730 | 4/1990 | Hashimoto | 379/70 |

(List continued on next page.)

OTHER PUBLICATIONS

*Patent Abstracts of Japan*, vol. 11, No. 319, May 18, 1987, Abstract No. 62–107389, Kageyama et al.
Patent Abstracts of Japan, vol. 14, No. 489, 10 Aug. 1990, Abstract No. 02–202143, Hashimoto.
Patent Abstracts of Japan, vol. 11, No. 319, 18 May 1987, Abstract No. 62–107376, Ikegami.
Analyzing Language in Restricted Domains, 1986, Associated Pub., Hillsdale, NJ, Erlbaum et al.
Patent Abstracts of Japan, vol. 11, No. 284, 16 Apr. 1987, Abstract No. 62–828853 Hatakeyama.
Patent Abstracts of Japan, vol. 12, No. 62, 11 Sep. 1987, Abstract No. 62–203273, Mike et al.
Patent Abstracts of Japa, NEC (DRP) vol. 12, No. 100, 12 Oct. 1987, Abstract No. 62–232087.
Patent Abstracts of Japan, vol. 12, No. 187, 18 Dec. 1987, Abstract No. 62–291250, Kenbo et al.
Patent Abstract of Japan, vol. 12, No. 238, 08 Feb. 1988, Abstract No. 63–29881, Kobe et al.
Patent Abstracts of Japan, vol. 14, No. 249, 05 Mar. 1990, Abstract No. 02–64767, Yoda.

*Primary Examiner*—David M. Huntley
*Attorney, Agent, or Firm*—Ostrager, Chong & Flaherty

[57] ABSTRACT

A machine translation and telecommunications system automatically translates input text in a source language to output text in a target language using a dictionary database (22) containing core language dictionaries for general words, a plurality of sublanguage dictionaries for specialized words of different domains or user groups, and a plurality of user dictionaries for individualized words used by different users. The system includes a receiving interface (11) for receiving input from a sender, in the form of electronic text, facsimile (graphics) input, or page image data, and an output module (30) for sending translated output text to any designated recipient(s). The input text is accompanied by a cover page or header (50) identifying the sender, one or more recipients, their addresses, the source/target languages of the text, any sublanguage(s) applicable to the input text, and any formatting requirements for the output text. The system uses the cover page or header data to select the core language, sublanguage, and/or user dictionaries to be used for translation processing, to format the translated output text, and to send the output to the recipient(s) at the designated address(es). The dictionary database (22) can cumulate and evolve over time by adding new words as scratch entries to the user dictionaries and, through the use of dictionary maintenance utilities, by updating and/or moving the scratch entries to higher-level subdomain, domain, or even core dictionaries as their usage gains currency.

6 Claims, 13 Drawing Sheets

U.S. PATENT DOCUMENTS

| | | | |
|---|---|---|---|
| 4,980,829 | 12/1990 | Okajima et al. | 364/419.05 |
| 4,996,707 | 2/1991 | O'Malley et al. | 379/100 |
| 5,077,804 | 12/1991 | Richard | 382/7 |
| 5,079,701 | 1/1992 | Kuga et al. | 364/419.11 |
| 5,157,384 | 10/1992 | Greanias et al. | 340/706 |
| 5,175,684 | 12/1992 | Chong | 364/419.03 |
| 5,197,005 | 3/1993 | Shwartz et al. | 364/419 |
| 5,274,801 | 12/1993 | Gordon | 395/600 |
| 5,283,887 | 2/1994 | Zachery | 395/500 |

FIG. 2

FIG. 3 the accompanying drawings, forming a part hereof, in which:

Fig. 1 is a front view of the design of the stove for cooking in accordance with the invention:
Fig. 2 is a top view of the stove of Fig. 1;
Fig. 3 is a bottom view of the stove of Fig. 1;
Fig. 4 is a right side view of the stove of Fig. 1;
Fig. 5 is a left side view of the stove of Fig. 1;
Fig. 6 is a rear view of the stove of Fig. 1.

\* 术竹州木

\*\*furnance; burner

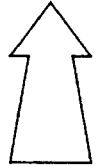

已收刊机料的文件讨件

1 诒求书
2 权利要求书
3 说明书
4 说明书附图
5 说明书搞要
6 搞要附图

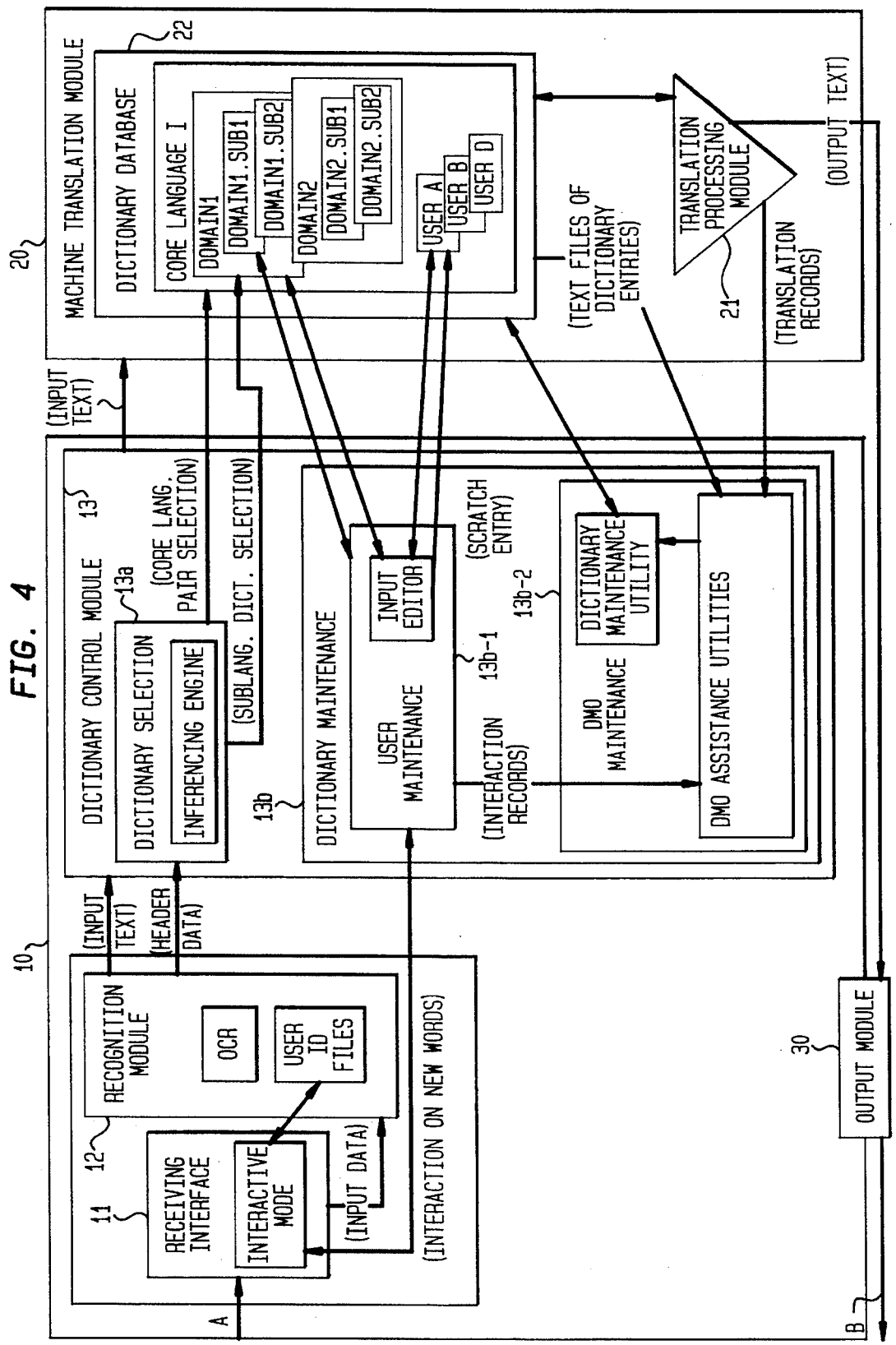

FIG. 7C

```
E_mouse:
[
  E-NType-1

E-NFeatX=+
  E-NFeatY=-
  E-NFeatZ=0 group=comp
]
[
  E-VType_Trans
]
```

```
EJ_mouse:
[
  EJ-NType-M transl=**
]
[
  EJ-VType-Tr-TrPP
  Other frame references transl=@@
]
```
← REFERS TO OTHER ENTRIES AND GRAMMAR RULES RELEVANT TO "MOUSE"="MANIPULATE DATA WITH A MOUSE"

```
J_**:;'computer mouse'
[
  J-NType-R

J-FeatX=+
  J-FeatY=-
  J-FeatZ=0 group=comp
]
```

```
J_@@:;'manipulate'
[
  J-VType-TrPP

J-VFeatX=+
  J-VFeatY=-
  J-VFeatZ=0 group=comp
]
```

MACHINE TRANSLATION AND TELECOMMUNICATIONS SYSTEM

SPECIFICATION

This application is a continuation of Ser. No. 07/920,456 filed Aug. 12, 1992, now abandoned, which is a continuation-in-part of U.S. patent application Ser. No. 636,400, entitled "Automatic Text Translation and Routing System", filed on Dec. 31, 1990, now issued as U.S. Pat. No. 5,175,684.

TECHNICAL FIELD

This invention relates to a system for automatic (machine) translation of text and, more particularly, to a telecommunications-based system for automatically translating and sending text from a sender to a recipient in another language.

BACKGROUND ART

After several decades of development, the field of automatic (machine) translation of text from a source language to a target language with a minimum of human intervention has developed to a rudimentary level where machine translation systems with limited vocabularies or limited language environments can produce a basic level of acceptably translated text. Some current systems can produce translations for unconstrained input in a selected language pair, i.e., from a chosen source language to a chosen target language, that is perhaps 50% acceptable to a native writer in the target language (using an arbitrary scale measure). When the translation system is constrained to a particular vocabulary or syntax style of a limited area of application (referred to as a "sublanguage"), the results that can now be achieved may approach a level 90% acceptable to a native writer. The wide difference in results is attributable to the difficulty of producing accurate translation when the system must encompass a wide variability in vocabulary use, syntax, and expression, as compared to the limited vocabularies and translation equivalents of a chosen sublanguage.

One example of a machine translation system limited to a specific sublanguage application is the TAUM-METEO system developed by the University of Montreal for translating weather reports issued by the Canadian Environment Department from English into French. TAUM-METEO uses the transfer method of translation, which consists basically of the three steps of: (1) analyzing the sequence and morphological forms of input words of the source language and determining their phrase and sentence structure, (2) transferring (directly translating) the input text into sentences of equivalent words of the target language using dictionary look-up and a developed set of transfer rules for word and/or phrase selections; then (3) synthesizing an acceptable output text in the target language using developed rules for target language syntax and grammar. TAUM-METEO was designed to operate for English-to-French translation in the narrow sublanguage of meteorology (1,500 dictionary entries, with several hundred place names; text having no tensed verbs). It can obtain high levels of translation accuracy of 80% to 90% by avoiding the need for any significant level of morphological analysis of input words, by analyzing input texts for domain-specific word markers which narrow the range of choices for output word selection and syntax structure, and by using ad hoc transfer rules for output word and phrase selections.

Another example of a sublanguage translation system is the METAL system developed by the Linguistics Research Center at the University of Texas at Austin for large-volume translations from German into English of texts in the field of telecommunications. The METAL system also uses the transfer method, but adds a fourth step called "integration" between the analysis and transfer steps. The integration step attempts to reduce the variability of output word selection and syntax by performing tests on the constituent words of the input text strings and constraining their application based upon developed grammar and phrase structure rules. Transfer dictionaries typically consist of roughly 10,000 word pairs. In terms of translation quality, the METAL system is reported to have achieved between 45% and 85% correct translations.

A strategy competing with the transfer approach is the "interlingua" approach which attempts to decompile input texts of a source language into an intermediate language which represents their "meaning" or semantic content, and then convert the semantic structures into equivalent output sentences of a target language by using a knowledge base of contextual, lexical, and syntactic rules. Historically, transfer systems lacking a comprehensive knowledge base and limited to translation of sentences in isolation have had the central problem of obtaining accurate word and phrase selections in the face of ambiguities presented by homonyms, polysemic phrases, and anaphoric references. The interlingua approach is favored because its representation of text meaning within a context larger than single sentences can, in theory, greatly reduce ambiguity in the analysis of input texts. Also, once the input text has been decompiled into a semantic structure, it can theoretically be translated into multiple target languages using the linguistic and semantic rules developed for each target language. In practice, however, the interlingua approach has proven difficult to implement because it requires the development of a universal symbolic language for representing "meaning" and comprehensive knowledge bases for making the conversions from source to intermediate and then to target languages. Examples of interlingua systems include the Distributed Translation Language (DLT) undertaken in Utrecht, the Netherlands, and the Knowledge-Based Machine Translation (KBMT) system of the Center for Machine Translation at Carnegie-Mellon University.

Other machine translation systems have been developed or are under development using modifications or hybrids of the transfer and interlingua approaches. For example, some systems use human pre-editing and/or post-editing to reduce text ambiguity and improve the correctness of word and phrase selections. Other systems attempt to combine a basic transfer approach with knowledge bases and artificial intelligence techniques for machine editing and enhancement. Another approach is to combine decompilation to a syntactically-based intermediate structure with transfer to equivalent output phrases and sentences. For a further discussion of current developments in machine translation, reference is made to *Machine Translation, Theoretical and Methodological Issues,* edited by Sergei Nirenberg, published by Cambridge University Press, 1987, and "Proceedings of The Third International Conference on Theoretical and Methodological Issues in Machine Translation of Natural Language", published by Linguistics Research Center, University of Texas at Austin, Jun. 1990.

It is expected that machine translation (MT) systems will develop in time to provide higher levels of translation accuracy and utility. However, current MT techniques using a basic transfer approach can produce acceptable translation accuracy in a selected sublanguage, yet they are not in widespread use. One reason for the limited use of MT systems is that most current systems are designed for a single, specific application, environment and language pair context. The requirements of that context motivate the design and development of the grammar, dictionary structure, and parsing algorithms. Thus, the utility of the system becomes confined to that particular context. This approach greatly limits the range of applications and the audience of users which can be productively served by such application- and language-specific MT systems.

SUMMARY OF INVENTION

It is therefore a principal object of the present invention to provide a system for performing machine translation for different source languages, target languages, and sublanguages, and automatically sending the translated text via telecommunications links to one or more recipients in different languages and/or in different locations. The system should be capable of providing acceptable levels of translation accuracy and be readily upgradable to higher levels of accuracy and utility. It is a further object that such a system be capable of operation with a minimum of human intervention, yet have interactive utilities for obtaining and adding new word entries to its dictionary database. It is also desired that such a system be capable of building and organizing a large-scale dictionary database containing core language dictionaries, plural sublanguage dictionaries, and individual user dictionaries in a manner which cumulates and evolves over time.

In accordance with a principal aspect of the present invention, a machine translation and telecommunications system comprises:

(a) a machine translation module for performing machine translation from input text of a source language to output text of a target language;

(b) a receiving interface for receiving input via a first telecommunications link, said input including an input text to be translated accompanied by a control portion having at least a first predefined field therein for designating an address of a recipient to which translated output text is to be sent;

(c) a recognition module coupled to said receiving interface for electronically scanning the control portion and recognizing the address of the recipient designated in the first predefined field of the control portion; and (d) an output module including a sending interface for sending translated output text generated by said machine translation module to the address of the recipient recognized by said recognition module via a second telecommunications link.

In a more specific aspect of the invention relating to sublanguage selection, a machine translation system comprises:

(a) a receiving interface for receiving an input text and a sublanguage control input indicative of a selected sublanguage applicable to the input text from among a plurality of possible sublanguages;

(b) a machine translation module capable of performing machine translation of an input text in a source language to an output text in a target language using a dictionary database containing entries for words of the target language corresponding to words of the source language;

(c) a dictionary database including a core language dictionary containing entries for generic words of the source and target languages, and a plurality of sublanguage dictionaries each containing entries for specialized words of a sublanguage;

(d) a dictionary control module responsive to the sublanguage control input for selecting a sublanguage dictionary of the dictionary database applicable to the input text, and for causing the machine translation module to use the selected sublanguage dictionary in performing translation of the input text; and (e) an output module for outputting translated text in the target language generated by the machine translation module.

In the present invention, the sublanguage control input causes a selected sublanguage dictionary deemed applicable to the input text to be used in order to perform more accurate translation of the input text. The dictionary database includes core and sublanguage dictionaries for different source/target languages and sublanguages. The machine translation system with this multiple core languages and sublanguages capability is employed in a telecommunications system which automatically translates and transmits text from a sender to one or more recipients in other languages. A cover page or header accompanying the input text is used to designate the selected source/target languages, the applicable sublanguages, and the address(es)—electronic, fax, or mail—of the recipient(s).

In a preferred embodiment, the receiving interface receives input text as electronic (machine-readable) text over a communications line, or as page image data via a fax/modem board or page scanner. The receiving interface is operated in a computer server along with a recognition module for converting any page image data to electronic text. The recognition module scans and recognizes designations of the cover page or header accompanying the input text for determining the selections of the source/target languages and sublanguage(s) applicable to the input text. In the case of electronic text, the cover page and the input text may be introduced by means of a disk file, by downloading an electronic file, or by online user-system interaction. An optional interaction mode prompts the user for information concerning the user's identity, sublanguage preferences, etc., in order to facilitate generation of a suitable cover page. Inferencing algorithms may be used to assess the user and cover page information and determine the applicable sublanguage dictionary(ies).

The output module may have a page formatting program for composing the translated output text into a desired page format appropriate to a particular recipient or target language. It may also have a footnoting function for providing footnotes of ambiguous phrases of the input text in their original source language and/or with alternate translations in the target language. The output module includes a sending interface coupled to a fax/modem board for facsimile transmission, or a printer for printing output pages, or a telecommunications interface for sending output electronic text to a recipient's electronic address. The modularity of the receiving interface, dictionary database, dictionary control module, and output module from the machine translation module assures that, as machine translation improvements are developed, the machine translation module may be upgraded or replaced without rendering the other portions of the system dysfunctional or obsolete.

As another aspect of the invention related to a machine dictionary database, a machine translation system comprises:

(a) a machine translation module for performing machine translation of input text in a source language to output text in a target language using a dictionary database containing entries for words of the target language corresponding to words of the source language;

(b) a dictionary database including a core language dictionary containing entries for generic words of the source/target languages, a plurality of sublanguage dictionaries each containing entries for specialized words of a sublanguage used by a group of users, and a plurality of user dictionaries each containing entries for individualized words of a user; and (c) a dictionary control module responsive to control inputs to the machine translation system for causing the machine translation module to use the core language dictionary, any applicable sublanguage dictionary, and any applicable user dictionary for performing translation of an input text attributed to a user of the system.

In the invention, a large-scale dictionary database is maintained which has dictionaries containing word entries specified linguistically at different hierarchical levels of usage. At the lowest (user) level, a particular user can enter temporary or "scratch" word entries into a respective user dictionary. The machine translation system uses the particular user's dictionary to perform machine translation of text which may contain idiosyncratic or new words or phrases particularly used by that user. The dictionary control module includes dictionary maintenance utilities which allow such scratch entries to be entered by users into their user dictionaries, and which assist a dictionary maintenance operator (DMO) to review the scratch entries so that they can be confirmed as valid dictionary entries for machine translation. The dictionary maintenance utilities include automated programmed procedures for assessing whether word entries appearing in lower-level dictionaries should be moved into higher-level dictionaries.

Other objects, features, and advantages of the present invention will become apparent from the following detailed description of the preferred embodiments of the invention, as considered with reference to the following drawings:

BRIEF DESCRIPTION OF DRAWINGS

FIG. 2 is an illustration of a cover page for designating core language pair, sublanguage(s), and recipient information, and accompanying text pages.

FIG. 3 is an illustration of input ideographic text and output English text as performed by the machine translation system using page formatting functions.

FIG. 4 is a schematic diagram of the dictionary control module, including dictionary selection and maintenance submodules, the latter containing an (interactive) user maintenance module and a dictionary maintenance module.

FIG. 7C illustrates a typical content of an identical word entry from which a scratch word entry is created.

DETAILED DESCRIPTION OF PREFERRED EMBODIMENTS

Figure 1:
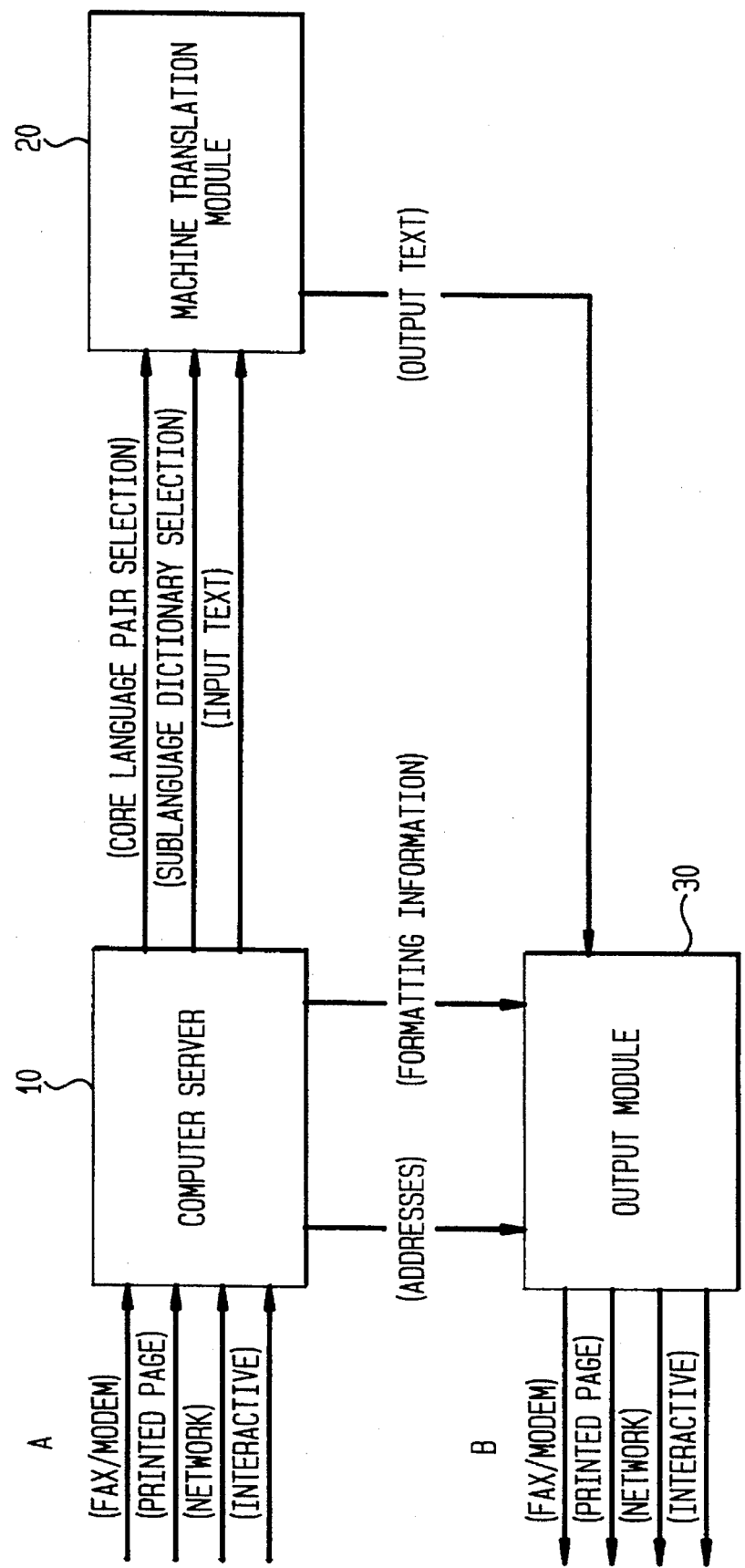
FIG. 1 is a schematic diagram of a machine translation and telecommunications system in accordance with the invention.

Referring to FIG. 1, a preferred form of the machine translation and telecommunications system in accordance with the present invention comprises a computer server 10, a machine translation module 20, and an output module 30. (These and further-described components of the system will be denoted with capital letters for clarity of reference.) The Computer Server 10 receives electronic text input accompanied by a cover page or header from any of a plurality of input sources, designated generally as a telecommunications link A. The Computer Server 10 has a function for recognizing control data in the cover page or header designating core language and sublanguage selections applicable to the input text to be translated. It also recognizes output addresses and page formatting data to be used by the Output Module 30 for transmitting the translated text to the designated recipient(s) via any of a plurality of output devices, designated generally as a telecommunications link B. Due to the modularity of the system, the Machine Translation Module 20 may be updated by operator maintenance or upgraded or replaced without rendering the other functions of the system dysfunctional or obsolete.

The Machine Translation Module 20 is capable of performing machine translation from input text in a source language to output text in a target language. In the examples of a machine translation (MT) system described herein, reference is made to an MT system of the transfer type which relies upon the use of a machine-readable dictionary for lookup of source/target word entries. The principles of the present invention may also be applied to an MT system of the interlingua type. Transfer-type MT systems are widely accepted for near-term usage than interlingua systems, and they rely more heavily on linguistic knowledge incorporated into machine dictionaries designed for source/target language pairs. The operation of transfer-type MT systems is well understood by those skilled in the machine translation field, and is not described further herein.

Input Data Reception and Extraction

Figure 1A:
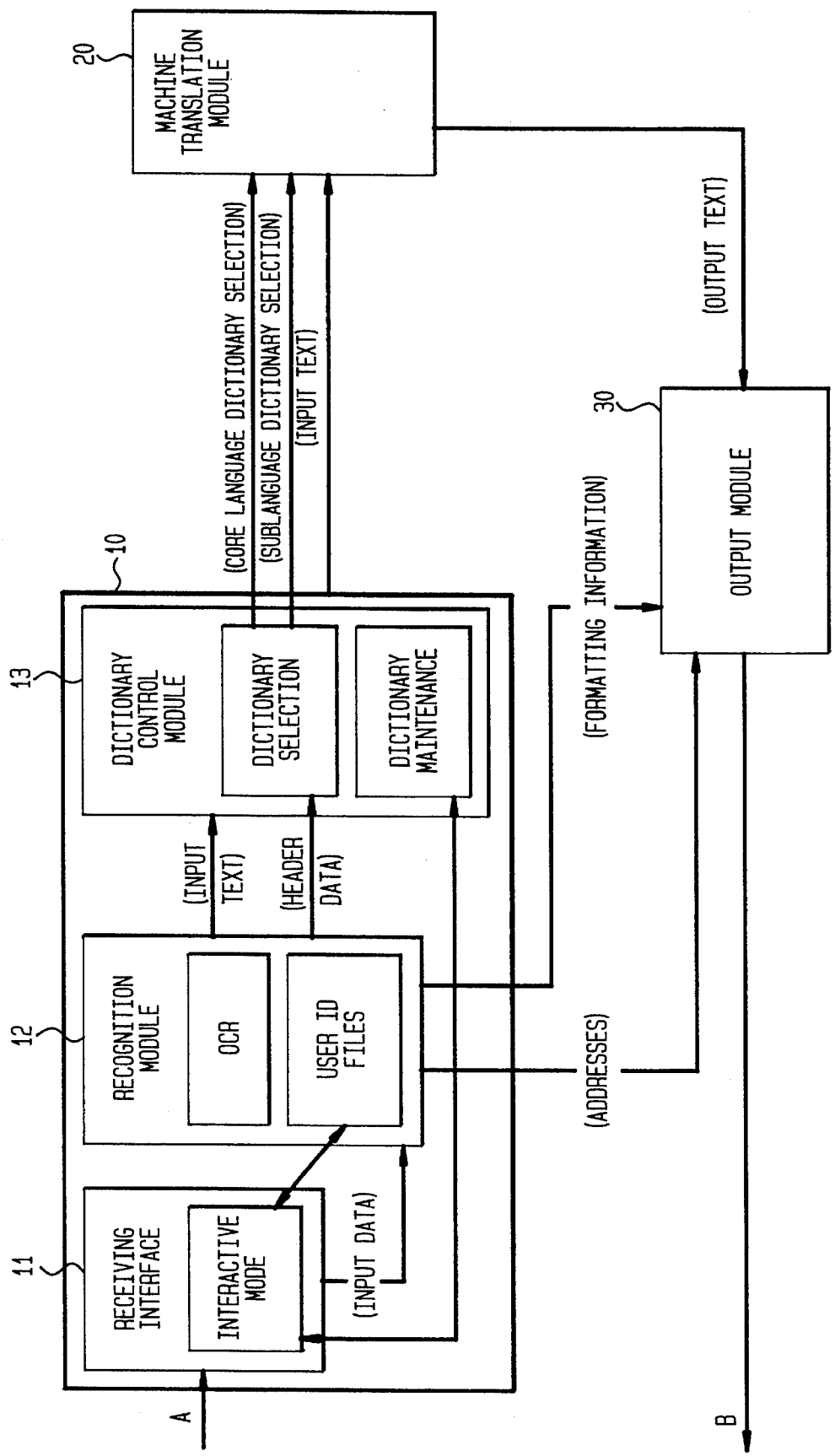
FIG. 1A is a schematic diagram of a computer server which includes a receiving interface, recognition module, and dictionary control module, and is coupled to a machine translation module and an output module.

FIG. 1A shows the Computer Server 10 having a Receiving Interface 11 linked to the telecommunications link A, a Recognition Module 12, and a Dictionary Control Module 13. The Receiving Interface 11 may include an interactive mode program (to be described further herein) whereby a user can provide cover page or header designations, update or create User ID files pertinent to translation parameters associated with that user's communications, or create specialized user dictionary entries during interactive text entry sessions. The Recognition Module 12 includes a character recognition (often referred to as "OCR") program which recognizes and converts page image data into machine-readable text, and which recognizes cover page designations or user designations referencing cover page data stored in the User ID files. The Dictionary Control Module 13 includes a Dictionary Selection Module, which assesses the control data it receives from the Recognition Module 12 and designates the appropriate core language and sublanguage dictionary(ies) to be used by the Machine Translation Module 20. It also includes a Dictionary Maintenance Module, which allows a dictionary maintenance operator (DMO) to create and update dictionary entries in the Dictionary Database 22.

Using the control data from a cover page or header accompanying the input text, the Computer Server 10 allows the system to automatically recognize a sender's designations of the source language of the input text, the target language(s) of the output text, any particular sublanguage(s) used in a specialized domain, user group, or correspondence type, any preferred page format for the output text, and the address(es) of one or more recipients to whom the output is to be sent. Thus, the system can automatically access designated core and sublanguage dictionaries maintained in the Dictionary Database 22 for different source/target languages and sublanguages, and can format and transmit the translated text to recipient(s) in respective target language(s) via telecommunications link B, without the need for any substantial human intervention.

The Computer Server 10 interfaces with a plurality of receiving devices. For example, input data can be received as a facsimile transmission via a fax/modem board plugged into the I/O bus for the server system. Such fax/modem boards are widely available and their operation in a server system is well understood by those skilled in this field. Input may also be received from a conventional facsimile machine coupled to a telephone line which prints facsimile pages converted from signals transmitted on the telephone line. A conventional page scanner with a sheet feeder can be used to scan in facsimile or printed pages as page image data for input to the Computer Server. The page image data is then converted to machine-readable form by the OCR program. Input may also be received through a telecommunications program or network interface as electronic text or text files (such as ASCII text), in which case conversion by the OCR program is not required.

The OCR program may be resident as an application program in the Computer Server 10 along with the interface programs for handling the reception of input data. OCR programs are widely available, and their operation is well known in this field. For example, an OCR program for recognizing Japanese kana and ideographic characters is offered by Catena Corp., Tokyo, Japan. An example of an OCR program for alphanumeric characters is WordScan™ offered by Calera Recognition Systems, Santa Clara, Calif. The Computer Server 10 is preferably a high-speed, multitasking PC computer or workstation.

Figure 2:
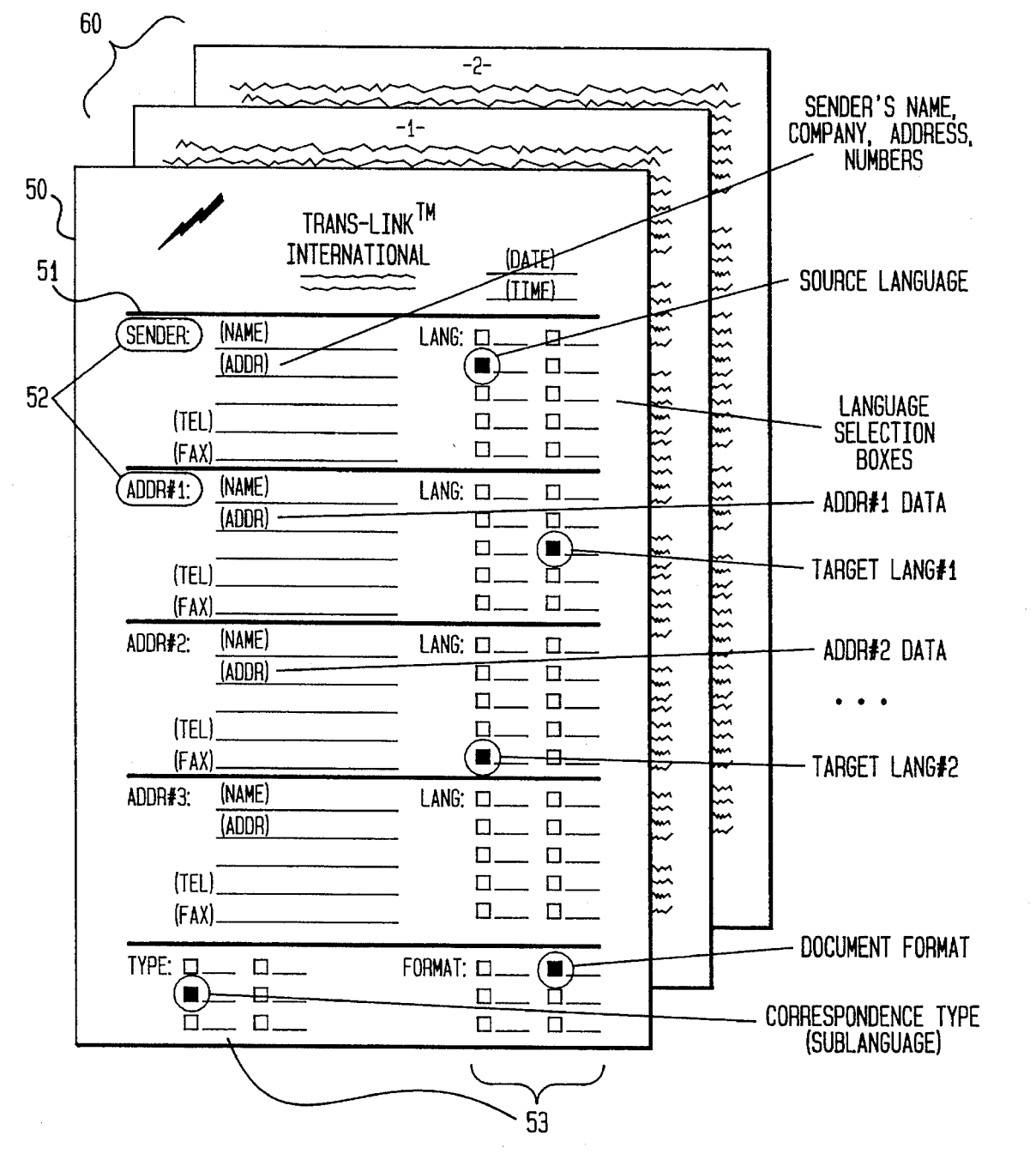

Referring to FIG. 2, the Computer Server 10 receives input data which is divided into two parts: a cover page or header 50 and input text 60. In the example shown, a cover page is used in conjunction with other pages of input text in a page-oriented system. In the case of transmission of an electronic text file or a text message, a preceeding header or identifier for the communication is used. The cover page 50 has a number of fields for designating selections of source/target language(s), sublanguage(s), page format, and recipient(s) for the text. The cover page 50 is organized with data fields in a predefined format which is readily recognized by the Recognition Module 12 of the Computer Server 10 so that the control data in the predefined fields can be readily recognized.

For example, the cover page 50 may be laid out and formatted with field boundaries and markings on the printed page for optically scanning with a high level of reliability. Line dividers 51 and large type-size headers 52 may be used to mark the sender, source/target language(s), sublanguage (communication type or subject matter), page format, and recipient address fields. Boxes 53, which can be marked or blackened in, allow the designated selections to be determined without error. The names of the sender and recipients, their respective companies, addresses, and telephone and/or facsimile transmission numbers are determined by character recognition once the respective fields 51, 52 have been distinguished. Any page length of input text 60 can follow the cover page 50. Alternatively, information ordinarily supplied by a cover page or header may be stored in the User ID files and supplied automatically as a memorized script in response to user selection.

It is the task of the Recognition Module 12 to extract data pertinent to dictionary selection from the fields of the cover page or header. In batch mode this data is predetermined—it is either filled into the cover page fields by the user with each specific translation transaction, or it can be supplied by a reference to the User Identification (ID) files resident in the Recognition Module 12.

In the Interactive Mode for specifying the cover page or header through the Receiving Interface 11, the user may first be presented with predetermined sets of fill-in data and then prompted for alternative values, or provided with a variety of alternatives from which to choose, based upon data already stored in the User ID files, or based upon inferences drawn from the data as it is entered by the user. For example, a User A may specify Recipient Z by name only, and then be presented with additional data, such as Recipient Z's address, title, or affiliation, already stored in the User ID files for verification or correction. Alternatively, Recipient Z may never have been addressed by User A in the past but may be a user categorized in Domain L, which is a domain of which User A is also a member, thus triggering the inference that the sublanguage dictionary of Domain L may be presented to User A as an option for use.

The user may be prompted in Interactive Mode to verify or choose among field values which aid in selecting one or more sublanguage dictionaries for a given translation, including correspondence types, subject domains, social indicators, etc. By automating the filling-in of cover page information, the system employs its computerized capabilities for the user while controlling and monitoring the completeness and cohesiveness of the data supplied.

The cover page may designate a plurality of recipients in a plurality of address locations and target languages, each of which may have particular formatting requirements for the output. For automated assistance, each prospective recipient can be referenced by an identifying code indexed to data stored in the User ID files. For example, a travel agent may have a regular set of clients in a variety of locations and languages, with access to a variety of communication modes, to whom he or she regularly sends advertising material. One client may require Japanese translation formatted as "right-to-left" vertical lines of ideographic characters, to be printed and sent as ordinary mail. Another may require faxed translation into German. Still another may have E-mail capability and require a printed copy as well. These combinations of addressees and requirements can be predefined and stored in the User ID files. The data for the cover page fields for each of these addressees may be indexed to mnemonic codes, such as the addressee's alphabetic name, and are retrieved from the User ID files by the Recognition Module.

The User ID files may be established at the time of subscription by a user to a machine translation service, and updated from time to time thereafter. Using the Interactive Mode, the user may be prompted to supply his or her name, sex, title, company, address, group affiliations, source language, etc., as well as data relevant to prospective recipients or groups of recipients to be stored in the User ID files for filling in cover pages automatically. Sublanguage selections appropriate to the user may be identified or queried by comparing the requirements of the user with those of other users subscribing to the service.

The user may be prompted to provide samples of typical texts expected to be submitted for translation, as well as individualized or key words for a thesaurus of terms. Automatic utilities may be employed to determine the sublanguage dictionary most applicable to the user, based in part on the thesaurus of relevant terms supplied by individual users and groups of users in the same subject domain. The recognition of the user's membership in one or more established groups or subject domains is an important part of dictionary selection and maintenance.

At the time of each translation transaction, the user may be prompted by the system to tailor the cover page to the specific translation transaction about to be initiated. The system may ask the user to confirm a default cover page configuration, to select or modify previously established cover page configurations, or to fill in a scratch cover page which may be blank or partially filled in with data from the User ID files.

Machine Translation Using Sublanguage Dictionaries

Figure 1B:
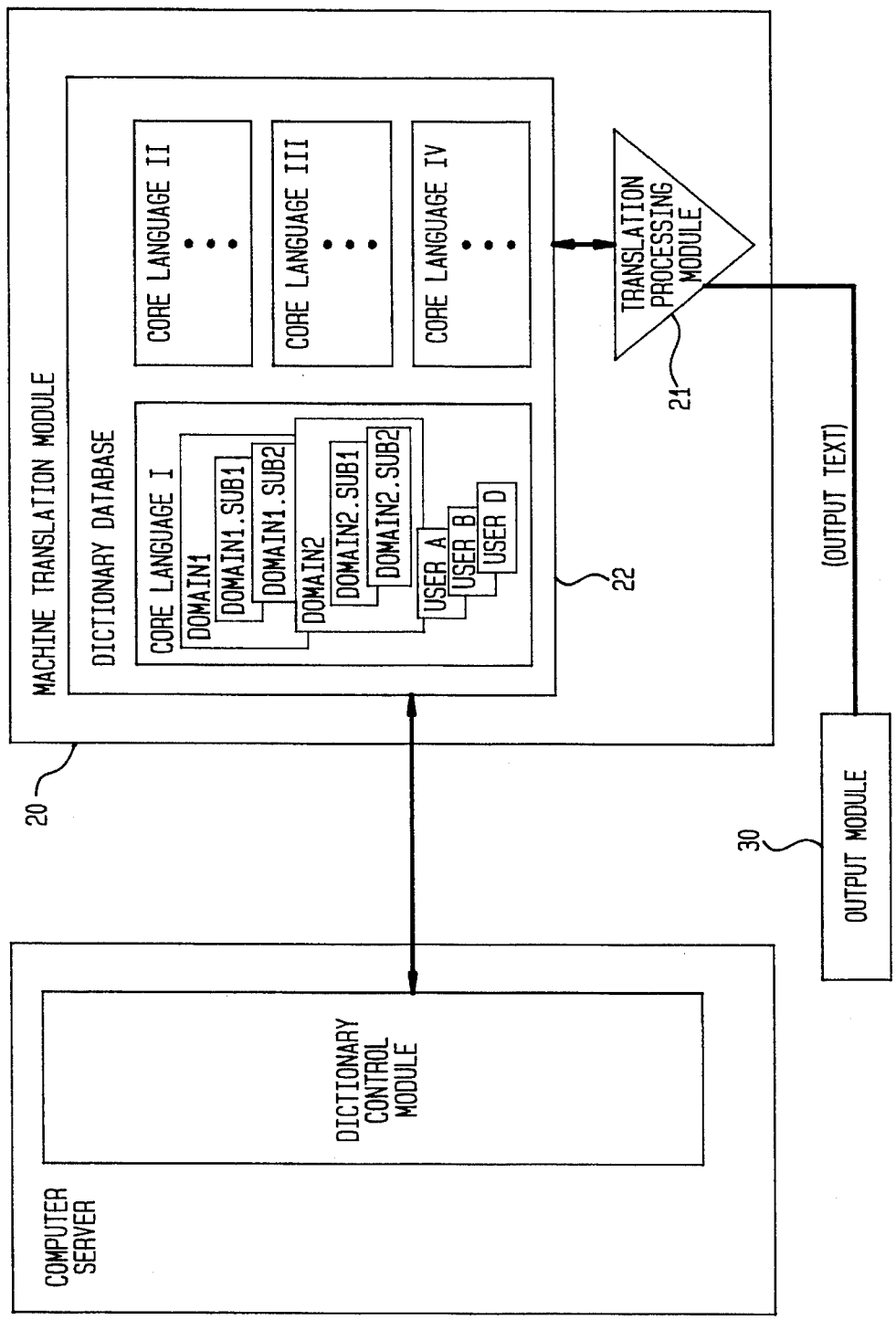
FIG. 1B is a schematic diagram of a machine translation module which includes a translation processing module and a dictionary database, and its linkage to the computer server and the output module.

As shown in FIG. 1B, the Machine Translation Module 20 is comprised of a Translation Processing Module 21, and a Dictionary Database 22 containing dictionaries for a number of core source/target languages I, II, III, IV, etc., each of which may contain a plurality of domain, subdomain, and user dictionaries. The Translation Processing Module 21 may be a conventional transfer-type system, such as the ECS Natural Language Processing System (hereinafter "ECS/MT system") offered by Executive Communication Systems, Inc., Provo, Utah. The selection indices for the core language and sublanguage dictionaries provided by the Dictionary Selection Module determine which dictionaries in the Dictionary Database are used. The selected dictionaries may be compiled together as one operating dictionary, or prioritized and arranged hierarchically in the system's RAM memory.

The Machine Translation Module is shown as a separate module which receives system data designating the core language and sublanguage(s), if any, to be used and the input text from the Computer Server 10 via the Dictionary Control Module 13. In this manner, the translation functions are kept separate from the receiving, recognition, User ID, dictionary selection, dictionary maintenance, and other functions of the Computer Server 10, so that they can be easily upgraded and/or replaced with enhanced programs without disruption to the remainder of the system. The Computer Server 10 acts as a control unit for the Machine Translation Module 20 by operation of the Dictionary Control Module 13 selecting core language and sublanguage(s) based upon data extracted by the Recognition Module 12.

The Computer Server, Machine Translation Module, and Output Module may all reside together on the same workstation. A current target for machine translation systems is a speed of about 20,000 to 30,000 words/hour. A workstation using currently available transfer-type translation programs can attain this range with a processor speed of about 50 to 100 MIPs (million instructions per seconds). Substantial savings on disk access times can be obtained by providing a RAM capacity sufficient to hold all selected core and sublanguage dictionaries in active memory. For a typical core dictionary size of 60K entries (100 bytes each) for the source, transfer, and target lexicons, plus three sublanguage dictionaries of 5K×3 entries each, as well as system program and operations files, a RAM capacity of the order of 48 MB of internal memory or more is desireable.

Alternatively, the system may be implemented with separate processing units. For example, the Computer Server and Output Module may be implemented as a telecommunications workstation, while the Machine Translation Module may be implemented via a RISC processor, parallel processors, or a supercomputer for high-speed batch processing of multiple source/target language, sublanguages, and output formats.

Machine translation is generally performed by passing each sentence of the text to be translated through a series of stages. Typically, these stages include: (a) source text dictionary lookup and morphological analysis; (b) identification of homographs; (c) identification of compound nouns; (d) processing of prepositions; (e) identification of nouns and verb phrases; (f) subject-predicate identification; (g) syntactic ambiguity identification; (h) processing of idioms; (i) mapping of source structures onto target structures; (j) synthesis and morphological processing of target text; and (k) rearrangement of words and phrases in target text.

As an example, the ECS/MT System is a transfer system based on Lexical Functional Grammar theory and constructs. An input sentence is parsed word by word in left-to-right fashion. Each word is searched by lookup in the source dictionary to determine its morphological, lexical, and syntactic attributes. In the ECS implementation of Lexical Functional Grammar, the indexed attributes of words are used to call analysis routines or invoke grammar rules which enable recognition of the word's place and function within a phrase component of the sentence. Decisions based upon the analysis rules and analysis process assist in disambiguating the lexical meaning and phrase structure of the input sentence in the source language.

The result of parsing in the analysis phase is an intermediary graph or table representing the source-language phrase structure of the sentence, mapped to a directed acyclic graph displaying the grammatical function of words within the sentence and their lexical attributes. This Lexical Functional Grammar representation is largely language independent. During the transfer phase, the functional structure representation of the source-language sentence is transferred by lexical and syntactic transfer rules into an equivalent target-language representation of functional structure and lexical attributes. This target-language representation is then synthesized into an output sentence using the lexical data and grammar rules provided by the target language dictionary. A core language dictionary, including source and target word entries, bilingual transfer entries, and morphological, syntactic, and lexical rules for both source and target languages, is required for each language pair.

In the present invention, the Translation Processing Module 21 uses a selected sublanguage dictionary containing specialized word entries and grammar rules specific to a sublanguage that is particularly applicable to the input text. Each sublanguage dictionary set up in the Dictionary Database 22 is chosen to have a manageable size, predictable modes of expression and syntactic structures, and a well-understood context for disambiguation of homonyms, polysemic phrases, and specialized references.

In the machine translation field, the term "sublanguage" usually refers to a recognized domain having a defined set of terms and patterns of language usage that characterize that domain. In the present invention, "sublanguage" is used more loosely to refer to any set of terms and patterns of usage attributed to a field of usage, group of users, or even an individual user. That is, a "sublanguage dictionary" is set up on a fluid or ad hoc basis whenever a preferred set of terms and usages is identified.

As illustrated in FIG. 2, for example, designated sublanguages might include correspondence types, such as business letters, legal/technical analysis, technical writing, financial/market reports, or general writing. Business correspondence typically employs only a few pages, a limited vocabulary (on the order of 6000 words), and a limited set of syntactic structures (often restricted to declarative sentences).

Designated sublanguages may also encompass specific fields, e.g., technical fields such as physics, chemistry, electronics, military, etc., or commercial fields such as travel and tourism, real estate, finance, shipping, insurance, etc., or groups of users such as associations, corporations, departments, or simply persons in regular communication with each other.

Sublanguage dictionaries may be set up corresponding to socially-determined usages or particular contexts in which certain communications take place. For example, in some languages, such as Japanese, certain words, forms of address, and even whole expressions are determined by the relative age, sex, position, grouping (internal/external), or environment of the speaker and the person being addressed. Such particular terms and usages can be set up as distinct sublanguage dictionaries that are accessed according to factors identified in the cover page or header for a communication, e.g., status or sex-indicative titles of the sender and recipient, positions in their respective companies, locations of the sender and recipient, etc.

Setting up sublanguage dictionaries can be implemented with dictionary-building tools currently used in machine translation systems. For example, the ECS/MT system provides a set of tools to develop a dictionary for a chosen language pair including technical terms for a chosen sublanguage. A Rule Editor tool allows a linguist to create and modify morphological rules, phrase structure rules, and transfer rules for the sublanguage. A Dictionary Maintenance Utility allows creation and modification of lexical entries, including source entries, target entries, and source-to-target transfer entries in the dictionary. A Translation Module performs table-driven translation using linguistic tables, analysis rules, transfer rules, and semantic preference entries that have been compiled into the dictionary. A Morphology Module applies rules to analyze morphologically complex words to determine uninflected forms for dictionary lookup of source lexical items and to generate morphologically complex words in the target language. A Semantic Preference Component operates on preferred semantic relations, the assignment of semantic attributes to lexical items, and the accessibility and matching of these attributes for lexical disambiguation and selection of preferred translations.

Dictionary Organization and Selection

In the present invention, core language dictionaries and a plurality of ad hoc sublanguage dictionaries (including both lexical entries and grammar rules for morphological and syntactic analysis and generation) are maintained in the system's Dictionary Database 22. The core language dictionaries are developed and maintained according to linguistic methods and tools commonly used in the machine translation field. In the present invention, sublanguage dictionaries are set up for any identified commercial or technical fields, application domains, groups of users, and even individual users. No particular effort is made to rigorously identify sublanguage boundaries or general sublanguage patterns. Instead, a sublanguage dictionary is set up or updated anytime the vocabulary or syntactic preferences of a user or group of users can be identified. Individual user or lower level dictionaries may be combined or integrated into master (higher-level) sublanguage dictionaries for any field, application domain, or user group when more general sublanguage vocabulary or syntactic preferences are identified.

The Dictionary Database embodies at once a hierarchical structure of nested dictionaries, arranged in order of generality of usage and exploiting inheritance of linguistic attributes within entries, and a relational structure, whereby the various dictionaries and the particular entries within them inform the establishment of subject domains and the sublanguage dictionaries pertinent to them. The Dictionary Database includes a core language dictionary which contains entries for words in their most general usages, as well as a set of grammar rules for analyzing and generating their morphological and syntactic structures. In the transfer approach, the core dictionary must contain three parallel entries for each term to be translated, i.e., two monolingual entries, one for the source language and one for the target language, containing information about the morphological, syntactic, and semantic characteristics of the word in relation to its own language, and a bilingual transfer entry specifying details required to translate the source word into the target, including information on whatever structural changes must be made during the translation process. The monolingual entries may be usable in a monolingual dictionary for another source/target language pair, however, the bilingual (transfer) entries are specific to the language pair involved.

As shown in FIG. 1B, the Dictionary Database of the present invention allows for a multiplicity of levels of nested sublanguage dictionaries along with the core language dictionary. At the lowest level, user dictionaries may exist for individual users. The user dictionaries are nested within higher-level "subdomain" or "master" dictionaries Sub1, Sub2, etc. The subdomain dictionaries contain more general word entries and grammar/linguistic rules that are common to the users grouped within or cross-referenced to that subdomain. The subdomain dictionaries are nested within higher-level "domain" dictionaries Dom1, Dom2, etc. The domain dictionaries contain even more general word entries and grammar/linguistic rules that are common to the subdomains grouped within or cross-referenced to that domain. At the highest level, the domain dictionaries are nested within the core dictionary which contains common words and rules that are generic to most or all of the included domains. The sublanguage dictionary entries have the same general structure as the core dictionary entries. Thus, in the transfer approach, the two monolingual and third transfer entries for each input word must be available in the sublanguage dictionary.

This hierarchical organization of dictionaries provides for minimum dictionary lookup time in the translation of a sublanguage-specific text, because it directs the lookup first to the user dictionaries, then to the sublanguage dictionaries. When the lower level dictionaries are searched first, a more accurate, efficient, and idiomatic translation is likely to be obtained than the broad-based and more general core dictionary could provide. If a lower level dictionary cannot analyze and resolve an input item, the Dictionary Control Module 13 then accesses a next level dictionary and finally the core dictionary upon failure of translation at a more specific level. The dictionaries are selected for domain specificity by the Dictionary Selection Module, but the progression of access is inherent in the nested structure.

Another aspect of the Dictionary Database lies in its treatment of linguistic information. The generativity of human grammar relies on the capability of organizing linguistic data into types, such as Noun, Verb, Adjective, etc., and subtypes, such as Transitive Verb, Intransitive Verb, etc., i.e., into a a hierarchy of types. It is possible to capitalize on this data classification computationally. In a preferred embodiment of the present invention, linguistic data may be specified as objects using well-known object oriented programming techniques. These techniques allow messages to be passed among objects regarding the manipulation of data pertinent to them and allow objects to inherit characteristics general to an overriding class of objects of which they are a member. The sublanguage dictionary organization allows particular features and processes to be indexed to entries in sublanguage dictionaries independent of any core dictionary entry for the same word, thus allowing the sublanguage use of that word to be domain-specific. Linguistic features and processes common to entries on several levels of the hierarchy can be used at all levels, thus streamlining maintenance of the linguistic analysis.

In its relational aspect, the Dictionary Database can allow access to and comparison of dictionaries on parallel levels in the hierarchy. Identical entries from the user dictionaries of several users in the same domain or group can be merged and "promoted" from user dictionaries to a higher-level dictionary upon application and satisfaction of certain reliability criteria. Utilities (described below) available to the Dictionary Maintenance Operator (DMO) allow investigation of relations between entries in user, subdomain, and domain dictionaries for the purpose of detecting and correcting overlapping or conflicting entries.

As illustrated in FIG. 4, the Dictionary Control Module 13 has two primary functions, Dictionary Selection and Dictionary Maintenance. In its Dictionary Selection capacity 13a, it determines the selection of core and sublanguage dictionaries to be used by the Machine Translation Module 20, based on the control data provided by the Recognition Module 12. The Dictionary Selection function includes an Inferencing Engine which assesses cover page or header data from the Recognition Module 12 and determines the dictionary selections to be supplied to the Machine Translation Module 20.

Dictionary Selection is exploited at the time of translation processing. It applies selection algorithms to the cover page or header data it receives from the Recognition Module 12 in order to determine the appropriate core and sublanguage dictionaries to be used for the translation of a given text. For example, the data can contain information as to core language pair, subject domain, correspondence type, and social indicators ("Mr." or "Mrs.", job titles, etc.), all of which may be used by the algorithms of the Inferencing Engine to select applicable sublanguage dictionaries. When each sublanguage dictionary is set up, specifications as to its usage parameters are indexed in the Dictionary Control Module 13.

Different approaches to the sublanguage dictionary selection and ordering algorithms may be used depending upon the type of data obtainable from the cover page and other aspects of the overall system. For example, at a simplest level, the selection algorithms of the Dictionary Control Module 13 can designate sublanguage dictionaries which directly correspond to variables of the cover page or header, e.g., the sender's name, the "communication type", the subject matter ("re"), etc.

A more developed sublanguage dictionary selection algorithm can make Boolean inferences about the context of the input text based upon the cover page data. For example, the user's group or relative social status can be determined by searching stored group lists or comparing the titles of the sender and recipient. This is particularly important for languages where correct terms of speech and address are dependent upon the context of a communication or the relative status of the parties. To illustrate, "IF the sender is a higher-level employee of a travel agency, AND the recipient is a lower-level employee of a hotel group, AND the communication is a "travel advisory", THEN USE Sublanguage Dictionary A23 for priority.1 lexical/grammar entries and Sublanguage Dictionary Z4 for priority.2 entries, OTHERWISE default to Core entries".

Dictionary Maintenance

The Dictionary Maintenance Module 13b enters, tracks, and maintains word entries in the multiplicity of core, sublanguage, and user dictionaries. The Dictionary Maintenance Module 13b includes an interactive User Maintenance capability 13b-1 with an Input Editor for creating temporary "scratch" entries in user dictionaries, and a DMO Maintenance capability 13b-2 with a programmed Dictionary Maintenance Utility for updating dictionary entries based on data analyzed and supplied by more general DMO Assistance Utilities.

A user dictionary may be created or initialized at the time of subscription by a new user to the machine translation service. In the Interactive Mode, the new user may be prompted to provide samples of typical texts expected to be submitted for translation, as well as individualized words for a thesaurus of terms relevant to that user. Later, the Input Editor of the User Maintenance Module 13b-1 may prompt a user to provide basic information that contribute to the maintenance of the user's dictionary. The Input Editor may be invoked in a variety of contexts. For example, during a translation session, the Input Editor may create scratch entries for the user's dictionary upon encountering unfamiliar words or phrases in the input text. During a dictionary-building session (outside of a translation session), the Input Editor may create scratch entries from a list supplied by the user. During a dictionary-maintenance session, the Input Editor may present the user with the contents of his or her personal dictionary for confirmation and updating. In all three contexts, the Input Editor attempts to extract the user's knowledge of the relationship of the words entered to one or more domains associated with the user, while requiring a minimum of user knowledge of linguistic principles or the structure of the Dictionary Database.

The user may be offered a choice of how elaborate the interaction is to be. For example, the user may choose to answer questions posed by the Input Editor about the syntactic and lexical properties of the new word. Alternatively, the user may choose an abbreviated option designed to provide only the linguistic information essential to a rudimentary translation of the word. The user may also be given the option of not creating a new entry for a particular word but settling for offering an acceptable substitute word or expression, or passing the source word into the target text untranslated. All these choices are saved for later review by the DMO.

Figure 5:
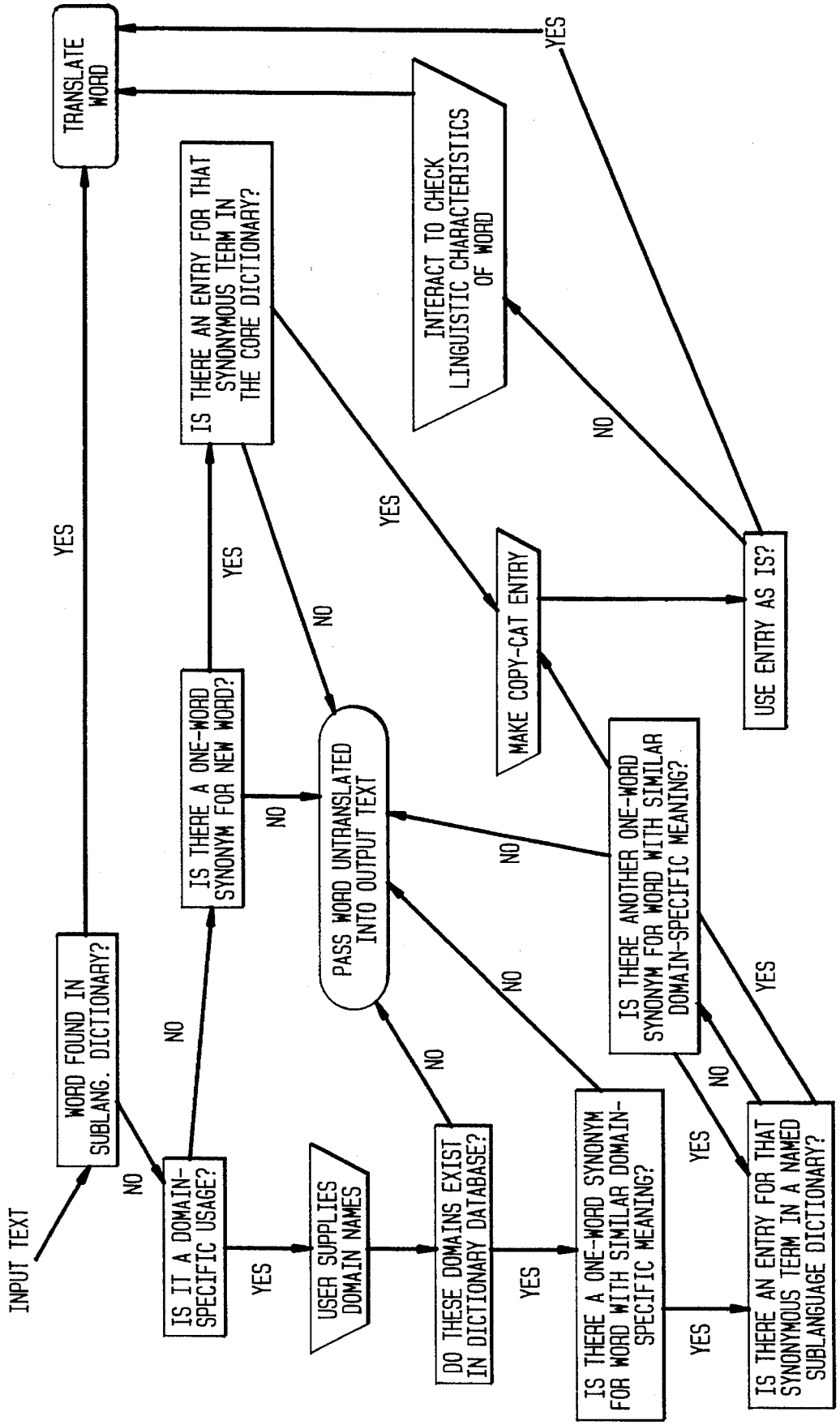
FIG. 5 is a schematic representation of an interactive input editor for interactions with users of the system.

As shown in FIG. 5, interactions that call for creation of a scratch entry may refer to similar entries or synonymous words present in the Dictionary Database. Upon encountering an unfamiliar word or phrase, the Input Editor may ask the user whether the word is a domain-specific usage. If so, the user is prompted to name an appropriate domain or may be presented with a list of domains established in the Dictionary Database from which to choose. Then the Input Editor prompts the user for a synonym of the unfamiliar word. The sublanguage dictionaries in the appropriate domain(s) are searched for an entry for that synonym. If one is present in a related sublanguage dictionary, it is imported to the user's dictionary. If not, the user may be prompted for additional synonyms and the process is repeated. If a synonym is not found in a domain-specific dictionary, the core dictionary may also be searched for the synonymous term.

If an appropriate synonym is found, a "copy-cat" entry is created for the new word in the user's dictionary, using the new word as the indexing name of the new entry and the content of the synonymous entry as its content. The user may be given the choice of using the content "as is", and the word is then translated in the manner specified by the content of the "copycat" entry. If the user does not want to use the entry "as is", the Input Editor may prompt the user for information regarding the new word's syntactic and lexical characteristics, to ascertain whether it is similar in those respects to the synonymous word from which the entry content was copied. The word may then be translated if the interaction results in an enabling specification of the new word. If not, the scratch entry is maintained for later review by the DMO, and the user can choose to offer a substitute word or expression or pass the source word into the target text untranslated.

Figure 7A:
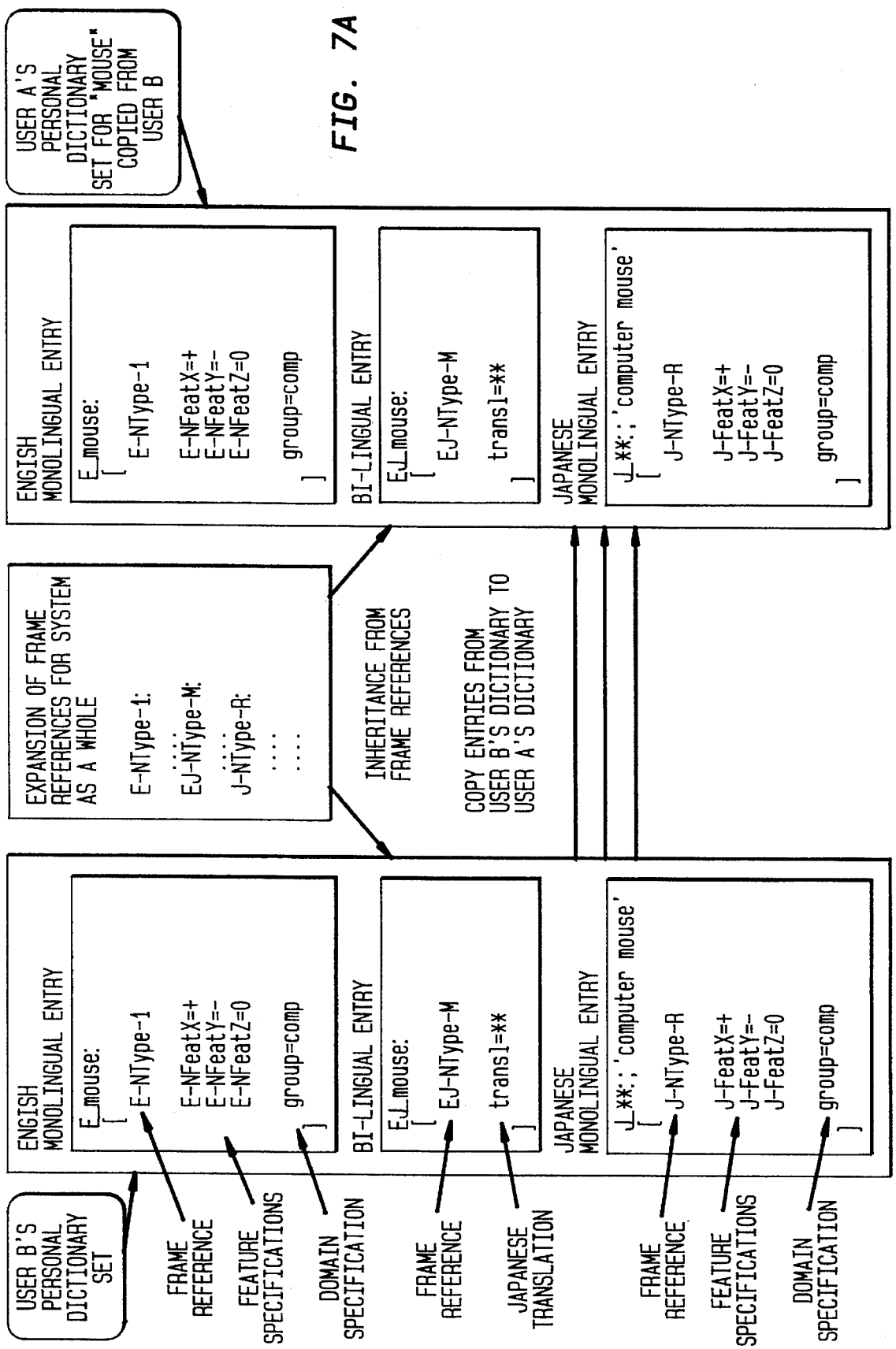
FIG. 7A illustrates, as a function of the dictionary maintenance utilities, the creation of scratch word entry from an identical word entry.

FIGS. 7A–7D illustrate an example of the creation of scratch word entries in user dictionaries and their promotion to a higher-level subdomain or domain dictionary. FIG. 7A is a representation of the creation of an entry for the word "mouse" (i.e., a computer peripheral device) in the dictionary of User A, based on a similar entry in the dictionary of User B. Both users are members of the sub-domain "Computer". The dictionaries of both users are nested within the core dictionary of the language pair English-to-Japanese. FIG. 7A illustrates this process for a transfer-type machine translation system. It can be implemented for an interlingua system in an equivalent manner.

User B's dictionary contains three types of entries necessary for transfer: an English monolingual entry (labeled "E_word"); an English-to-Japanese bilingual transfer entry (labeled "EJ_word"); and a Japanese monolingual entry (labeled "J_word ; 'computer mouse'"). These entries contain specifications uniquely labeled to refer to the rules and features pertinent to the word's grammatical functions and linguistic characteristics. Grammatical functions are specified by frame references, which refer to general rules for linguistic types (nouns, verbs, etc.). The inclusion of such references invokes relevant translation processing rules by inheritance from files available for use by the MT system as a whole. Linguistic features are characteristics unique to individual words, and their values are supplied within the entries themselves.

For instance, the English monolingual entry illustrated in FIG. 7A contains a NounType frame reference (E-NType-1) and three features (E-NFeatX, etc.). The bilingual entry contains a transfer-rule frame reference (EJ-NType-M) and the specification of the translation of the word "mouse" (the Japanese translation is represented here as **). The Japanese monolingual entry contains the frame reference J-NType-R and three features. The two monolingual entries contain a group specification, i.e., group=comp (Computer).

Upon encountering the new word "mouse" in text input to the system by User A, the Input Editor may interact with the user as follows:

Q: Is this a domain specific usage?
R: Yes.
Q: What is the domain?
R: Computers.

With this information, the Input Editor scans the dictionaries of other users in the "computers" sub-domain and finds an entry for "mouse" in the dictionary of User B. The input Editor performs certain checks to ascertain whether this entry is in fact pertinent tO the domain in question, including a search for group type, e.g., whether User B's entry for "mouse" contains the specification group=comp. The group specification for the word "mouse" may be necessary in addition to User B's membership in the sub-domain "computer", since User B may be a member of other groups and domains as well. Additional checks may be performed to determine the relevance of the entry, in the form of further questions posed to User A. In this illustration, for example, the Input Editor could ask User A whether the word "mouse" is a noun (inferring Noun status from the names of the frame references and features within the entries), whether it had a positive value for NFeatX, etc.

Upon determining that the entry for "mouse" found in User B's dictionary is a suitable match for User A's purposes, an entry for User A's dictionary is created by making a copy of the relevant entry from User B's dictionary, and a record of the transaction is made for later review by the DMO. The copying process allows the generic functions of the noun to be inherited by User A's entry through the frame references (illustrated by the small box in the top center of FIG. 7A), as well as the featural characteristics unique to the word "mouse".

Figure 7B:
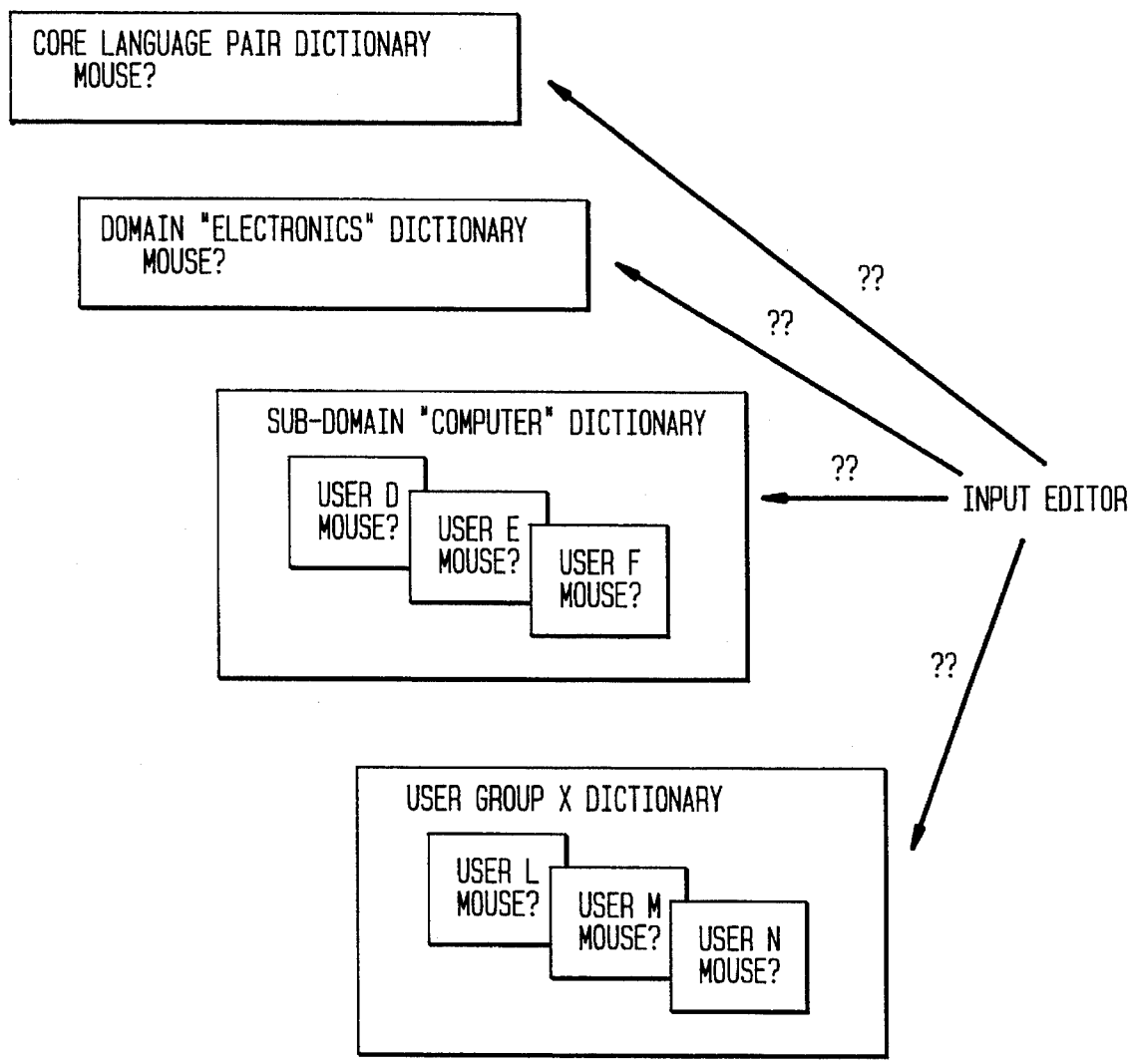
FIG. 7B illustrates the use of utilities with an interactive input editor to scan various levels of the dictionary hierarchy for word entries on which to base scratch word entries.

If no entries for the word are found in the dictionaries of users in the "computer" domain, the Input Editor may scan for entries in lower- and higher-level dictionaries, including the core dictionary. FIG. 7B illustrates this broader scanning process. As the search moves farther from the domain specified by User A, the Input Editor proceeds with greater caution in selecting candidate entries for building User A's scratch entries, by further checks and caveats to the user, and can also include a notation of caution in the DMO record. FIG. 7C illustrates an example where the same entry is found in another user dictionary in another domain.

Figure 7D:
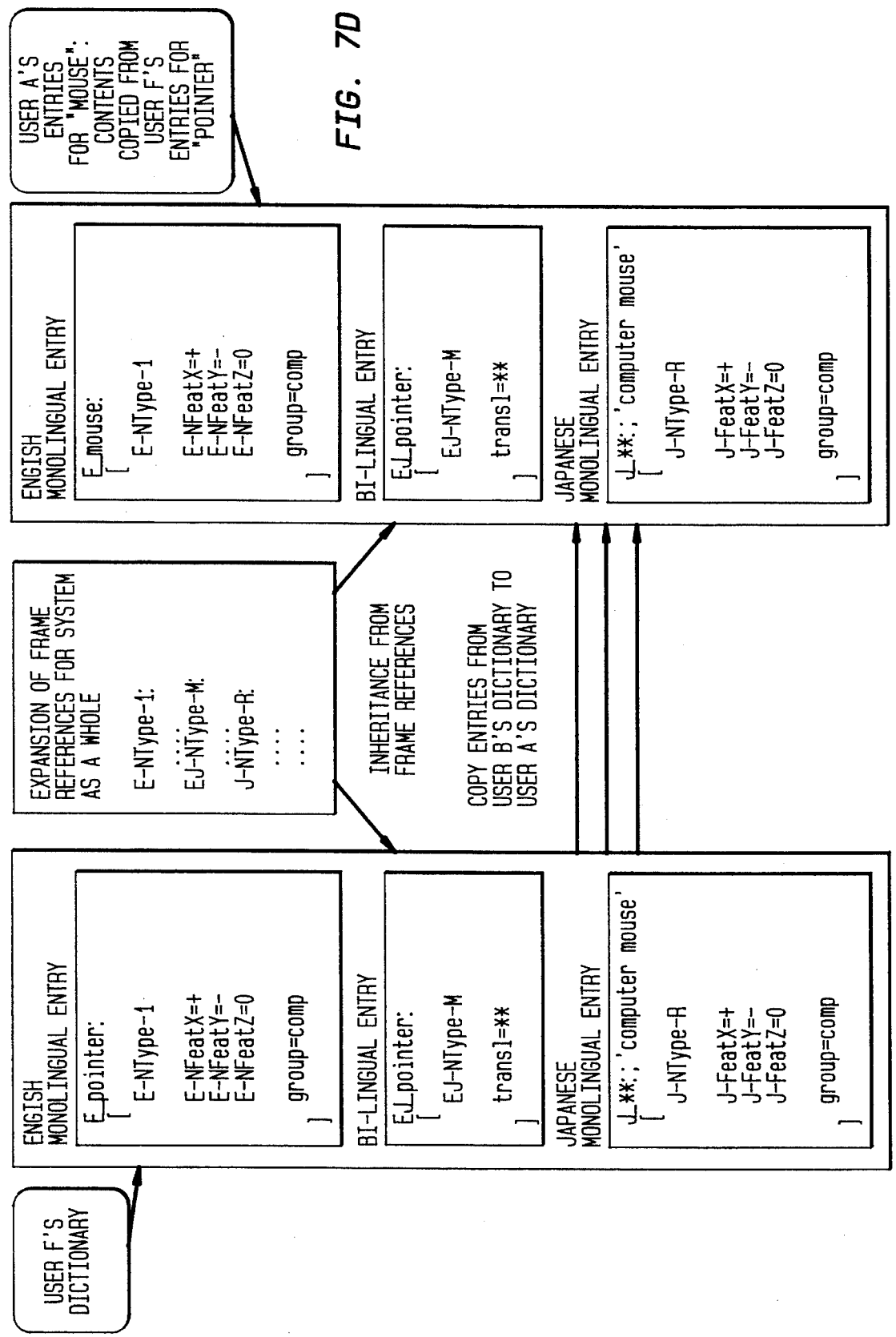
FIG. 7D illustrates the creation of a "copy-cat" word entry from a synonymous word entry.

If no entries for the same word are found in the available dictionaries, the Input Editor may ask for a synonym for the word. In this example, User A may respond with "pointer"

as a synonym for "mouse". The system can then scan the various levels of dictionaries for entries of the synonym. If a synonym entry is found, e.g., in User F's personal dictionary, the Input Editor can pose questions to User A regarding the features of the found entry, as outlined above. If a determination is made that User F's synonymous entry is a suitable match for User A's purposes, a "copy-cat" entry is created, with the entry label of User A's term (e.g., "mouse") and the features of the User F's entry relevant to "pointer". Once again, a record of this transaction is made for further oversight by the DMO. FIG. 7D provides an illustration of the "copy-cat" entry process.

The addition of scratch entries through the Input Editor of the User Maintenance Module 13b-1 into user dictionaries provides the MT system with a pre-screened corpora of words for which basic information on linguistic features and domain (sublanguage) relations are supplied. The pre-screened corpora provides a high-quality source of new words and usages, so that the linguist is saved the laborious effort of field surveys of language usages. The Dictionary Database is thus continually updated along with actual words and usages encountered in texts and/or as supplied by users.

An important feature of the present invention is the capability to move word entries from a lower-level (user, subdomain/group, or domain) dictionary into a higher-level (subdomain/group, domain, or core) dictionary, when those entries have met certain tests of linguistic completeness and more general usage that indicate the desirability of inclusion in a higher-level dictionary. A language is in a constant state of evolution as new words and usages are adopted by individuals and groups and then gain currency through larger groups and a society as a whole. The movement of entries into more general dictionaries requires review and monitoring by a dictionary maintenance operator (DMO) trained in linguistics and the translation of new words and expressions, in order to ensure that inaccurate translations or corruptions of the Dictionary Database do not occur. The present invention provides for certain automated utilities in the DMO Maintenace Module 13b-2 which assist the DMO in the movement of word entries to higher-level dictionaries. If linguistic and syntactic features can be reliably determined under program control, the DMO assistance utilities can perform the movement of such word entries on an automated basis. The DMO assistance utilities provide the way for substantially computerized management of very large dictionary databases which can improve the accuracy, performance, and utility of machine translation systems.

The manifold tasks of Dictionary Maintenance are fundamental to the operation of the machine translation system described herein. The tasks of the DMO are to monitor the adding of new dictionary entries and deleting or modifying of already existing ones. Choices as to which entries are added or deleted, which aspects of entries are modified, and which dictionaries and sublanguage dictionaries are affected by these changes are made by the DMO based upon data on usage and effectiveness of entries derived by employing the programmed assistance utilities.

As illustrative examples, the DMO Maintenance Module 13b-2 may include basic utilities to aid in extracting and organizing word entries from the underlying corpora, such as: conversion of compiled dictionary entries (including grammar rules) to text files for display, for ease of perusal and manual editing; automated creation of the records mentioned above and presenting them as text files; detection of errors in the structure of dictionary entries and presenting faulty entries as text files; extracting and displaying a list of all lexical entries by entry name only (a "shelf list" of entries in the dictionary); extracting and displaying a list of all bilingual lexical entries by entry name and translation only (including syntactic category for disambiguation), i.e., a bilingual "shelf list"; and/or detection of missing links in inheritance hierarchies, to prevent access to a higher-level dictionary without such link(s).

This set of extraction and display utilities can assist the DMO in maintaining a level of consistency and control in Dictionary Database monitoring. A primary focus of the present invention is identifying, creating, maintaining, and using sublanguage dictionaries suited to the lexical and linguistic idiosyncracies of groups of users. These aspects require the ongoing assessment and maintenance of the relations between and among sublanguage dictionaries, based upon fluid word usage patterns of members of the same domains or groups.

Maximal efficiency in performing these dictionary-relation tasks call for sophisticated utilities to be available to the DMO. Such utilities may include the capability to keep track of all instances of entries of a new word by users in the same domain. A frequency-of-use utility can determine the frequency of use, number of entries, and identity of a preferred synonymous entry. A further utility can present such data to the DMO for possible "promotion" from user dictionaries to a domain dictionary. A sublanguage-selection utility can perform an analysis of the above-mentioned records and display patterns of use by individual users and groups of users, to assess the accuracy of the sublanguage dictionary selection process. A homograph entry utility can identify and display entries of homographs in user dictionaries in a given domain, to display to the DMO for analysis in determining the optimal formulation of the homographic entries, and possible promotion of entries to higher level dictionaries. A quality assurance utility can display new scratch entries for quality assurance checks or for promotion to a higher-level dictionary of approved entries.

As aids in maintaining the consistency of the linguistic and semantic feature organization of the system, utilities may also be provided for: finding and displaying entries containing a certain feature-value pair, e.g., entries containing the feature [+liquid]; displaying a shelf list of entries containing a certain feature-value pair; and displaying the organization of features to assist in tracking feature-assignment errors.

Figure 6:
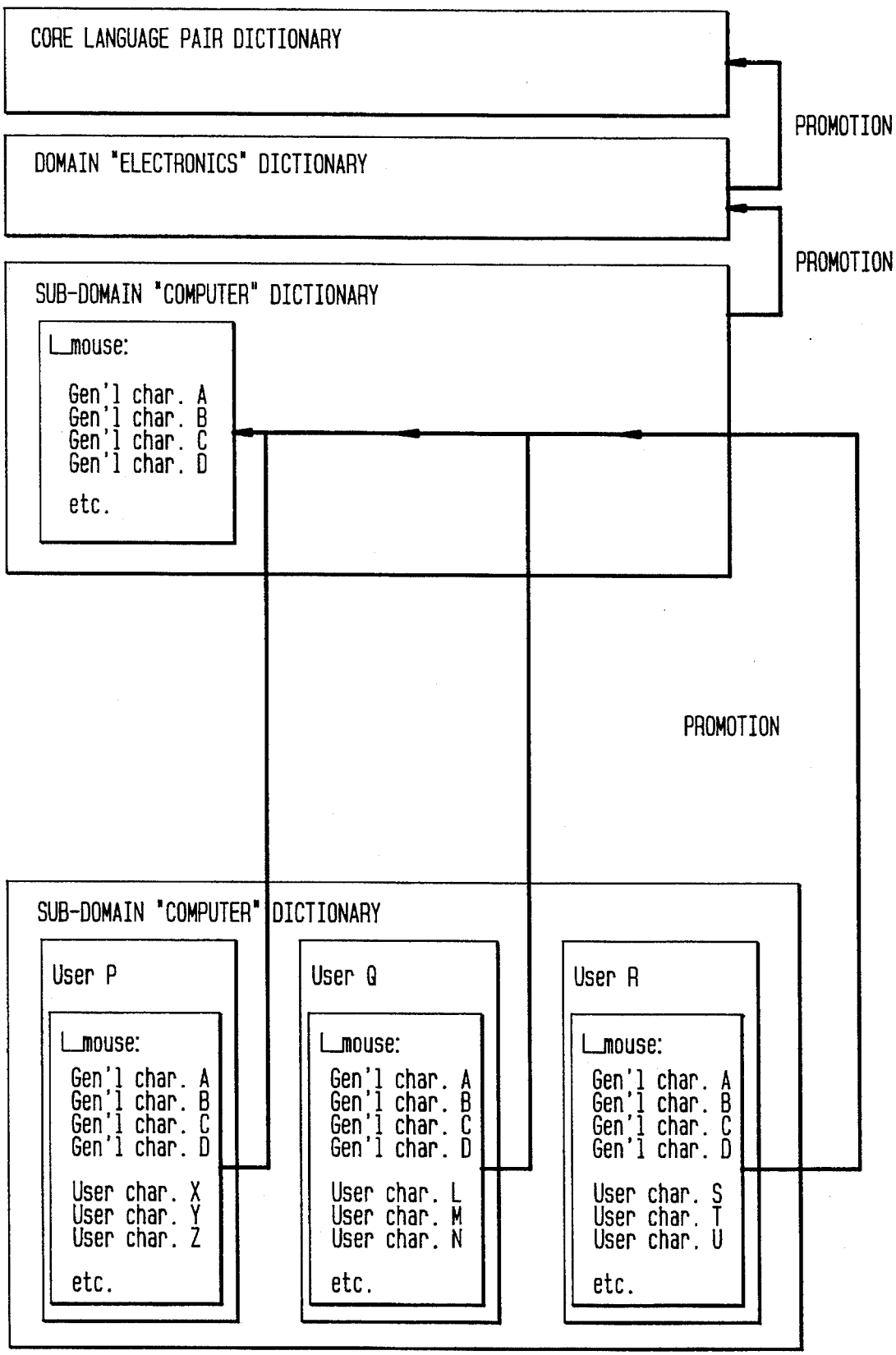
FIG. 6 is a schematic diagram illustrating dictionary maintenance utilities for collapsing and promotion of entries from subordinate to superordinate dictionaries.

The DMO Assistance Utilities may also employ algorithms to perform cross-dictionary comparisons, concordances, integration, differentiation, statistical matching, cluster analysis, etc., in order to resolve matching, conflicting or overlapping entries in different dictionaries. For example, the utilities may be used to scan the dictionaries of users from the same domain or group to see whether any word entries may be collapsed into a more general word entry and "promoted" from the user dictionaries to the domain dictionary. An example of such entry promotion is shown in FIG. 6.

Criteria for a sufficient level of similarity among entries in subordinate dictionaries can be measured using statistical or numerical algorithms as indicated above. Such measures and others may be employed to determine which characteristics of entries are general and thus suited for inclusion in the entries to be created for the higher level dictionaries, and which are idiosyncratic to the users whose dictionaries are the source of the entries. Thus, promotion of entries to higher level dictionaries need not involve their erasure from the user level. Higher level entries are promoted with only the applicable general characteristics. Idiosyncratic characteristics, if any, may be kept in the user dictionaries. Entry promotion can occur between adjacent levels within the dictionary hierarchy.

The DMO Assistance Utilities may also measure cooccurrences of words and terms in the input texts of individual users or groups of users to determine group membership and relations between groups and members, to infer characteristics based upon those recorded for similar groups or members, or to derive sublanguage terms for creation of master (superordinate) sublanguage dictionaries. Such analyses may also yield lists of key words for a thesaurus that is used to select a sublanguage dictionary appropriate to certain users.

With information contributed by the DMO Assistance Utilities, the DMO can create lists of words and phrases to enter, delete, or move from one sublanguage dictionary to another. Similarly, the DMO can employ data supplied by feature extraction utilities to alter features in the appropriate lists of entries. The DMO may create and alter entries by inputting the data to a text file and compiling the file into the Dictionary Database. However, a more sophisticated and efficient set of utilities can be provided which automates the creation and modification of lexical entries, including source entries, target entries, and source-to-target entries in a dictionary.

In summary, the Dictionary Control Module allows the overall machine translation system to possess a very fluid and highly granular sublanguage capability. The sublanguage capability is developed and cumulated over time based upon the encountered words and identified preferences of actual users, user groups, domains, or fields. The multiple sublanguage dictionaries are like the listings of synonyms and alternate phrase usages in a real-world dictionary, except that the entries can change along with usage, and the capacity for domain-specific usages is virtually limitless. Computational power in the manipulation of the multiplicity of sublanguage dictionaries replaces the need to rigorously define an overall set of sublanguage patterns for a given domain. Horizontal expansion of sublanguage capability thus replaces vertical definition.

Output Formatting and Transmission

Figure 1C:
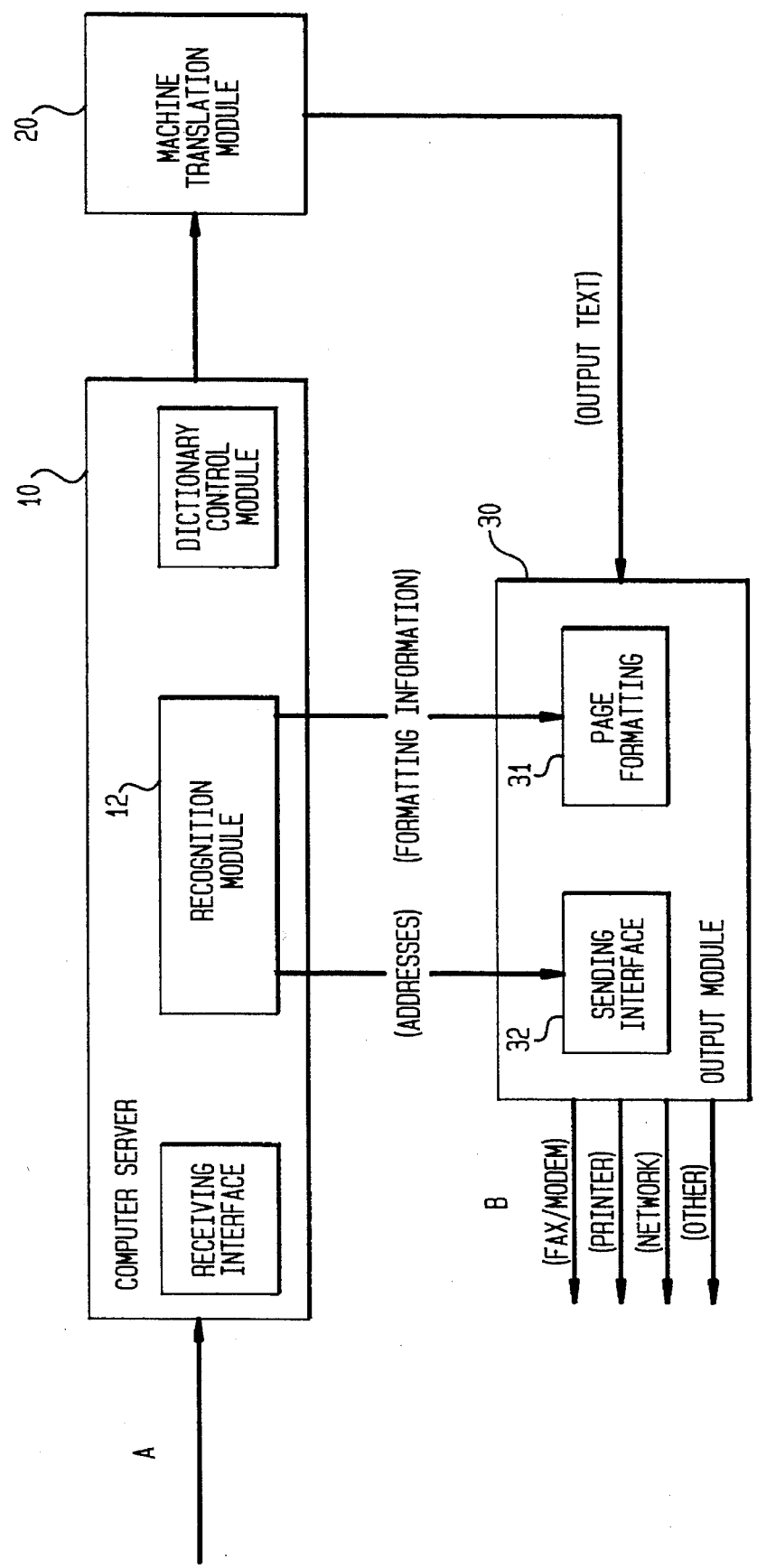
FIG. 1C is a schematic diagram of the output module, including a page formatting module and a sending interface.

As shown in FIG. 1C, the Output Module includes a Page Formatting capability 31 driven by formatting instructions extracted from the cover page or header for the translated text by the Recognition Module 12, and a Sending Interface 32 which transmits the formatted output text via telecommunications link B to recipients at their addresses as extracted from the cover page and supplied by the Recognition Module 12.

Once the input text has been translated into target language text, the Page Formatting capability of the Output Module 30 composes the translated text into a desired page format based upon the formatting information designated on the cover page. For example, for English-to-Japanese translation, the output Japanese text may be formatted as "left-to-right" horizontal lines of kana, or as "right-to-left" vertical lines of ideographic characters. The page format may also be designated for "page-by-page" translation, wherein the formatting program takes into account the compression ratio between the source and target text. For example, as illustrated in FIG. 3, English text is typically more spatially expansive than ideographic text, so that an 8.5"×11" input page of English text may be reformatted on the same size page with Chinese characters of suitably larger point size and interline spacings. Correspondingly, a typical 15.2 cm×25.6 cm page of ideographic text may be reformatted as an 8.5"×11" page of English text, or an 8.5"×11" or A4-size page may be reformatted as an 8.5"×14" page.

The formatting program may also implement a footnoting function, as shown in the section "F" in FIG. 3, which provides footnotes for ambiguous words or phrases of the input text by replicating the original source language text (indicated, for example, by a single asterisk) and/or providing alternate translations in the target language (indicated by double asterisks). The source language text and/or alternate translation are provided by flagging an ambiguous word or phrase which could not be resolved in translation processing. Other well-known page formatting functions, e.g., margins, page layout, columns, replication of non-translatable graphic images, etc., may also be performed by the Output Module 30.

When the formatted output document is ready for output transmission, the Sending Interface 32 generates the command signals for controlling the corresponding output devices and sending the output document as electronic data signals to the respective devices through the telecommunications link B. The output devices can include a telephone fax/modem board, a printer, a facsimile machine, or a network interface for sending the output data to a recipient's electronic address on a network. As shown in FIG. 2, the cover page may designate a plurality of recipients in different target languages and located at different addresses. The Sending Interface 32 generates and routes the appropriate forms of output data to each recipient. For example, if each recipient is designated to receive a fax transmission and a printed copy, the Sending Interface routes the data through the fax/modem board to each recipient's fax number and also activates the printer for printing a hard copy for mailing.

General Telecommunications Applicability

The above-described machine translation system can be installed as a resident utility or service in telecommunications systems and networks, such as private and public networks and gateway companies, telecommunications companies, and bi-or multilingual information service providers. The input to the system is preferably in the form of electronic text for the near term. With further development, input in the form of graphics (facsimile) data and even speech can be captured, scanned, and/or converted to intermediary text for translation processing and then output in any desired form. As the Dictionary Database develops in depth and breadth of coverage of sublanguages for a wide range of domains, the system will accumulate the accuracy and capability to handle communications over a wide range of fields satisfactorily. Mass storage and inexpensive processing power and speed can be effectively utilized to handle many different language pairs, technical fields, domains, user groups, and users for translations in a host of languages.

For near term use, the machine translation system is particularly suitable for translating electronic text for E-mail, electronic bulletin boards, and information and network services. As described above, an Interactive Mode may be provided to interact with an online user inputting text to be translated and transmitted via a network. In this mode the user is prompted to fill in cover page fields, create and maintain User ID files, or update the Dictionary Database.

For electronic text input and output in different languages, it is desirable to have a standardized interface to the many different character code conventions used throughout the world. A universal character code convention has been developed by the Unicode Consortium, Mountain View, Calif. The Consortium includes IBM, DEC, Apple, and other major American computer companies. The Unicode set is a 16-bit character code set that is mapped to the major character code conventions of the world, including the major Roman alphabetic systems and Asian character systems. For example, the Unicode set is mapped to the Han character sets of the major industry and national standards used in China, Japan, Korea, and Taiwan. Thus, a Unicode character converter module can be employed as the standardized interface for electronic text in a telecommunications system.

Text input can also be scanned in from printed pages or from transmissions via a fax/modem. The system's Recognition Module is used to convert such scanned page image data into machine-readable text. Currently, off-the-shelf programs are available for English alphanumerics and Japanese kana. Future developments in character recognition programs for other character sets, such as Chinese Han and Japanese kanji characters, and even handwritten-characters, can be expected to further the development of page-oriented translation systems.

We claim:

1. A machine translation system comprising:
   (a) a machine translation module for performing machine translation of an input text in a source language to an output text in a target language using a dictionary database containing entries for words of the target language corresponding to words of the source language;
   (b) a dictionary database including a core language dictionary containing entries for generic words of a source/target language pair, a plurality of sublanguage dictionaries each containing entries for specialized words of a respective one of a plurality of sublanguages handled by the machine translation system for the source/target language pair, and a plurality of user dictionaries each containing entries for individualized words used by a respective one of a plurality of users of the machine translation system for the source/target language pair;
   (c) a receiving interface for receiving a particular input text sent by a particular user and accompanying control inputs indicative of a preferred sublanguage applicable to the particular input text out of a plurality of possible sublanguages and indicative of a preferred user dictionary out of the plurality of user dictionaries; and
   (d) a dictionary control module responsive to the control inputs received by the receiving interface for causing the machine translation module to use the core language dictionary, and for selecting a preferred sublanguage dictionary and a preferred user dictionary for use by the machine translation module for translation of the input text, wherein said receiving interface further includes a programmed module for allowing users of the machine translation system to input scratch entries for individualized words into their respective user dictionaries, and wherein said dictionary control module further includes an automated dictionary maintenance utility for automatically assessing whether a word entry has been entered as a scratch word entry in common to a given number or grouping of users through their respective user dictionaries and for thereupon automatically entering said word entry into a higher-level sublanguage dictionary for a sublanguage encompassing those users.

2. A machine translation system according to claim 1 wherein the dictionary database contains a plurality of core language dictionaries corresponding respectively to a plurality of source/target languages, the receiving interface includes means coupled to the dictionary control module for receiving a source/target control input indicative of a selected core language dictionary applicable to the input text, and the dictionary control module includes means responsive to the source/target control input for causing the machine translation module to use the selected core language dictionary for translation of the input text.

3. A machine translation system according to claim 1, wherein said programmed module of said receiving interface includes means for prompting and receiving user input defining linguistic features of a scratch word entry input to the respective user dictionary, and the dictionary control module includes user maintenance utilities enabling the scratch word entry defined with said linguistic features to be added into the corresponding user dictionary.

4. A machine translation system according to claim 3, wherein said dictionary control module includes user maintenance utilities enabling the linguistic features of a scratch word entry to be defined by reference to a similar word entry already defined with linguistic features in another user dictionary.

5. A machine translation system according to claim 1, wherein the dictionary database has a nested form of organization such that user dictionaries are at a lowest level and nested within higher-level sublanguage dictionaries, and sublanguage dictionaries are nested within a core language dictionary at a highest level, and the dictionary control module provides access by the machine translation module to a selected user dictionary, a selected sublanguage dictionary, and the core dictionary in order from the lowest to the highest level.

6. A machine translation system according to claim 5, wherein the dictionary control module includes DMO assistance utilities for receiving input from a dictionary maintenance operator and allowing the DMO to update the word entries of the dictionaries of the dictionary database, and the dictionary control module includes dictionary maintenance utilities for enabling the DMO to input commands for moving a word entry appearing in common in the user dictionaries of a domain or group of users into a higher-level sublanguage dictionary for that domain or group of users.

* * * * *